(12) United States Patent
Rice

(10) Patent No.: US 7,792,864 B1
(45) Date of Patent: Sep. 7, 2010

(54) ENTITY IDENTIFICATION AND/OR ASSOCIATION USING MULTIPLE DATA ELEMENTS

(75) Inventor: Scott Gregory Robert Rice, Beaverton, OR (US)

(73) Assignee: TransUnion Teledata, L.L.C., Beaverton, OR (US)

( * ) Notice: Subject to any disclaimer, the term of this patent is extended or adjusted under 35 U.S.C. 154(b) by 342 days.

(21) Appl. No.: 11/818,908

(22) Filed: Jun. 14, 2007

Related U.S. Application Data (60) Provisional application No. 60/813,792, filed on Jun. 14, 2006.

(51) Int. Cl.
*G06F 7/00* (2006.01)

(52) U.S. Cl. .................. 707/795; 707/791; 707/809

(58) Field of Classification Search .......... 707/1–6, 707/10, 100–102, 104.1, 795, 791, 809
See application file for complete search history.

(56) References Cited

U.S. PATENT DOCUMENTS

| | | | |
|---|---|---|---|
| 5,634,049 A * | 5/1997 | Pitkin | 707/102 |
| 5,724,575 A * | 3/1998 | Hoover et al. | 707/10 |
| 5,758,351 A * | 5/1998 | Gibson et al. | 707/104.1 |
| 5,826,250 A * | 10/1998 | Trefler | 706/50 |
| 5,991,714 A | 11/1999 | Shaner | |
| 5,991,758 A * | 11/1999 | Ellard | 707/6 |
| 6,047,280 A * | 4/2000 | Ashby et al. | 707/2 |
| 6,311,186 B1 * | 10/2001 | MeLampy et al. | 707/10 |
| 6,629,097 B1 * | 9/2003 | Keith | 707/5 |
| 6,694,325 B2 * | 2/2004 | Jas | 707/102 |
| RE38,572 E | 8/2004 | Tetro et al. | |
| 6,801,915 B1 * | 10/2004 | Mack | 707/100 |
| 6,879,983 B2 | 4/2005 | Bellamy et al. | |
| 6,912,549 B2 * | 6/2005 | Rotter et al. | 707/200 |

(Continued)

OTHER PUBLICATIONS

"Similarity Between the Ranganathan's Postulates for design a Scheme for Library Classification and Peter Pin-Sen Chen's Entity relationship Approach to data Modelling and Analysis"—Madan Mohan Kashyap—DESIDOC Bullentin of Information technology, vol. 21, No. 3, May 2001 (pp. 3-16 or 1-14) @ 2001, DESIDOC.*

(Continued)

*Primary Examiner*—John E Breene
*Assistant Examiner*—Anh Ly
(74) *Attorney, Agent, or Firm*—Northwest I.P. Law Group, L.L.C.

(57) ABSTRACT

Data values from a plurality of data elements can be combined to form one or more entity identifiers to facilitate identifications of and/or associations among a plurality of data records representing one or more entities. Associated data records can represent the same entity and/or multiple entities that can be properly associated. Associations can be made among two or more unique entities and/or their respective representative data records if they correspond to substantially the same entity identifier. In one embodiment, the number, type, and/or characteristics of values for data elements used to form an entity identifier can be selected so that the entity identifier is substantially statistically unique.

10 Claims, 4 Drawing Sheets

U.S. PATENT DOCUMENTS

| | | | |
|---|---|---|---|
| 7,103,605 B1 * | 9/2006 | Hazi et al. | 707/102 |
| 7,203,677 B1 * | 4/2007 | Dettinger et al. | 707/3 |
| 7,243,108 B1 * | 7/2007 | Jas | 707/102 |
| 7,461,077 B1 * | 12/2008 | Greenwood | 707/102 |
| 7,526,487 B1 * | 4/2009 | Bobbitt et al. | 707/100 |
| 2002/0010686 A1 * | 1/2002 | Whitesage | 705/80 |
| 2002/0038304 A1 * | 3/2002 | Gelfand | 707/100 |
| 2002/0059260 A1 * | 5/2002 | Jas | 707/100 |
| 2003/0018616 A1 * | 1/2003 | Wilbanks et al. | 707/2 |
| 2003/0046280 A1 * | 3/2003 | Rotter et al. | 707/6 |
| 2003/0200216 A1 * | 10/2003 | Hayes et al. | 707/9 |
| 2006/0161573 A1 * | 7/2006 | Dettinger et al. | 707/102 |
| 2006/0230039 A1 * | 10/2006 | Shull et al. | 707/6 |

OTHER PUBLICATIONS

Xin Li & Dan Rorh—"Discriminative training of clustering functions: Theory or experiments with entity identification"—Proceedings of the ninth conferences on computational natural language learning ACM 2005 (pp. 64-71).*

Van Hook et al. "Data consistency mechanisms to support distributed simulation"—Proceedings of the 13$^{th}$ workshop, 1995 (pp. 1-10).*

* cited by examiner

ENTITY IDENTIFICATION AND/OR ASSOCIATION USING MULTIPLE DATA ELEMENTS

RELATED APPLICATIONS

This patent application is a nonprovisional of and claims the benefit of priority from U.S. Provisional Patent Application No. 60/813,792, filed Jun. 14, 2006, which is hereby incorporated by reference in its entirety.

COPYRIGHT NOTICE

© 2007 TransUnion, LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d), (e).

TECHNICAL FIELD

Embodiments described in the present application relate to the field of identification and/or association of one or more data records representing entities within one or more data sources.

BACKGROUND

Many data sources, such as commercial data repositories, utility company customer databases, etc., to list only a few examples, store data records corresponding to individual entities, such as people, companies, etc. The data records are typically comprised of multiple data elements, and the value for each data element typically represents a particular aspect of the entity's identity, or other information related to the entity. Numerous commercial and noncommercial enterprises employ such data sources in a variety of ways as an integral part of their product or service offerings and daily operations.

Unfortunately, given the potentially vast array of records a data source can include, it often proves to be a challenge to search, analyze, and/or manipulate the entity-representing data in a meaningful way. Furthermore, some data sources contain inaccurate or out-dated information. For example, even using a well-indexed data source, it often can be difficult to identify with sufficient certainty that one or more particular records actually correspond to the specific entity they putatively represent. It can also be difficult to identify associations between multiple seemingly independent entity data records. Due to variations in the type, amount, and structure of data elements each data source can employ for its respective data records, the challenges of identifying and associating individual entities can be greatly magnified if multiple data sources are employed.

SUMMARY

Embodiments consistent with the present application can utilize, at least in part, entity data records comprising multiple data elements to facilitate identification of entities and/or associations being made among entities represented by the data records. The data records can originate from and/or be maintained within one or more data sources. Such embodiments can combine data values from a plurality of data elements to form an entity identifier, which can serve, at least in part, as a key for facilitating the identification of and/or associations among entities represented by a plurality of data records.

In one embodiment, the entity identifier can facilitate the identification of one or more data records corresponding to a unique entity, from one or more data sources. In addition or in the alternative, an embodiment can facilitate the association of multiple data records that represent the same entity, and/or multiple data records representing separate, associated entities. For example, associations can be made among two or more unique entities and/or their respective representative data records if they correspond to substantially the same entity identifier. In one embodiment, the number, type, and/or characteristics of data elements used to form an entity identifier can be selected so that the entity identifier is expected to represent an individual entity and/or associated entities with at least a predetermined confidence level.

Additional aspects and advantages will be apparent from the following detailed description of preferred embodiments, which proceeds with reference to the accompanying drawings.

DETAILED DESCRIPTION

Embodiments consistent with the present application can be implemented as systems, apparatuses, methods, and/or other implementations of subject matter for combining a plurality of data element values from data records originating from one or more data sources to form an entity identifier that can be used, at least in part, to facilitate identification of and/or associations among entities, as represented by the data records. In one embodiment, data elements selected to form an entity identifier can be selected at least in part, so that their respective data values can be combined and/or otherwise employed to form an entity identifier that can be substantially statistically unique. Employing an entity identifier that is substantially statistically unique can facilitate identifications and/or associations being made with confidence levels that are appropriately high for a given application. As used throughout this application and the attached claims, the term "confidence level" corresponds to a probability that an identified association does not represent a false positive association. Thus, the higher the confidence level, the less likely it is that data records will be erroneously associated with one another.

One advantage of embodiments consistent with the claimed subject matter is the ability to tailor the extent to which an entity identifier is statistically unique, which can correspondingly yield appropriately tailored confidence levels in the associations made among data records. The degree of uniqueness can be selected to suit the particular application, field of use, and/or implementation in which the entity identifier is to be employed. In certain embodiments and/or implementations, a high confidence level in the identification and/or association results can be desirable. In such instances a more statistically unique entity identifier can be used. In alternative embodiments and/or implementations, lower confidence in the identification and/or association of unique entities can be acceptable. In such instances an entity identifier that is less statistically unique can be employed. The phrase "substantially statistically unique" is employed herein consistent with the above described notions of flexibility, scalability, and customization. Two different entity identifiers can both be considered substantially statistically unique, even if one is more statistically unique than the other. One or more embodiments can require that an entity identifier should be at least statistically unique enough to provide meaningful and/or useful results for a given implementation.

In an implementation for which a relatively low result confidence association is acceptable, a relatively wider variety of data elements can be selected to form an entity identifier. Such implementations can employ data elements having values that are not very unique to individual entities, such as a name or date of birth, as but two examples. In a large dataset, there can be multiple data records representing several different entities with the same name and date of birth. However, in an implementation that requires entities to be identified and/or associated with a high-degree of confidence, data elements can be selected so as to form entity identifiers that can indicate associations with a confidence level that is sufficiently high for a particular intended application. As disclosed in more detail below, customization through varying the selection and/or number of data elements employed to form entity identifiers, as well as other factors, can allow the accuracy and/or reliability of operations performed on the data records to be tailored, at least in part, in accordance with the requirements of each specific implementation.

For purposes of facilitating discussion, and not by way of limitation on the claimed subject matter, one example of an entity identifier embodiment, presented for illustrative purposes, can be formed using data elements representing components of present and/or historic contact information and/or other identifying data stored in data records representing individual entities. For example, such data elements can include values representing, in whole or in part, address, phone number, e-mail handle, and/or other data representing an entity, to name but a few examples. An entity identifier embodiment can be formed from values for these and/or other contact information data elements and can be employed, at least in part, to facilitate identification of and/or an association among one or more entities as disclosed in more detail below.

In one or more embodiments, the statistical uniqueness of an entity identifier can be improved by selecting data elements to form the entity identifier that have values that are as evenly distributed across the population of entities as possible and/or practicable. In one embodiment, even distribution of values can be reasonably achieved by selecting data elements having values that are believed to be substantially randomly assigned to the entities represented by the data records. The concept of even distribution of values can be illustrated graphically as a histogram, frequency diagram, and/or other suitable depiction graphing the range of possible values for a selected data element against the number of instances of each possible value occurring in a given set of data records. Data elements having a distribution of values that graphs more flat, rather than as a bell-curve, can facilitate the formation of entity identifiers that are expected to identify associations among the data records with increased confidence.

To illustrate the above point, a data element storing values for the last four digits of a contact phone number would facilitate formation of an entity identifier that would yield higher confidence results than would an entity identifier formed from values for a data element storing zip code data. This is because zip codes, as in the example of the United States postal system designation, are not randomly assigned to, or evenly distributed among, entities. Rather, they are assigned based on entity location within geographic groupings. In comparison, the last four digits of an entity's contact phone number more closely approximate a random distribution throughout the population of entities. However, using a data element storing full telephone number values decreases the evenness and/or reasonable randomness of the value distribution, as telephone number area codes and prefixes are assigned based at least in part on geographic grouping. Similarly, the values for the last four digits of a nine-digit U.S. Social Security Number are relatively evenly and/or reasonably randomly assigned throughout the population of U.S. individuals, while the values for the first three and middle two digits exhibit grouping characteristics. Data records that have multiple common values for data elements having reasonably random and/or evenly distributed values can be more confidently associated with one another than can data records that have multiple common values for data elements having values with grouped distribution among the entities. Associating data records based on commonalities in poorly distributed values can lead to false positive associations. For example, it is possible that two data records can coincidentally contain two or more matching historical zip code values even though the data records represent neither the same entity nor entities that should be properly associated (such as family members, spouses, non-familial cohabitants, etc.). By obtaining knowledge of the content and/or characteristics of the data records and data elements included therein, specific data elements can be selected so as to form entity identifiers that can be used to associate data records with sufficiently high confidence and reduced instances of false positive associations.

To facilitate discussion, one or more embodiments are described below as employing house number values as contact information data elements used to form the entity identifiers. For illustration, if a data record includes an address of 1234 Main Street for an entity, the "1234" portion of the address is an example of a house number. Use of the term "house number" however is not meant to limit the claimed subject matter to addresses for houses, which are typically unattached single family dwellings. The term "house number" can apply to the corresponding portion of any address data, regardless of the form or type of dwelling, building, or edifice that exists at that location. Furthermore, a house number is but one example of a data element that can be employed consistent with the present application. House-number embodiments are described below only for illustrative purposes and not by way of limitation on the claimed subject matter. Those skilled in the relevant art will appreciate that additional and/or alternative data elements can also be employed consistent with this application and the claimed subject matter.

Continuing with reference to embodiments employing house-number data elements, for purposes of discussion, such embodiments can be implemented to facilitate entity authentication and/or identification with improved accuracy and reliability. This is facilitated, at least in part, by the fact that, within a range of common house number values, the values can be sufficiently evenly distributed among, and/or randomly assigned to, entities. Embodiments can use present and/or historic house number values, as but two examples. In addition to selecting house numbers as the type of data element to use in forming an entity identifier, the quantity, specifications, and/or characteristics of the house number data elements can also be chosen so as to achieve a confidence level that is substantially sufficient and/or tailored for a particular application and/or implementation. Such choices can be made, at least in part, based on the number and/or characteristics of the available data records and/or the entities the data records represent. As but one example, in an implementation using data records from data sources that reflect address histories for entities, an embodiment can combine values from a predetermined quantity of house number data elements associated with an entity to form one or more entity identifiers. For example, in one implementation, having a particular data set and/or grouping of data records, an entity identifier formed from values for two house numbers can be sufficiently unique to identify useful associations. A different implementation can require that values from three or more house numbers are used to form entity identifiers. Other variations are also possible consistent with the claimed subject matter.

Consistent with the claimed subject matter, multiple data elements can be selected based at least in part on having values exhibiting characteristics that make them suitable for combining to form an entity identifier that is substantially statistically unique for a given set of data records and/or represented entities. For example, in one embodiment, the number of possible values for an entity identifier can be approximated as the product of the number of digits composing the entity identifier times the number of available, distinct values per digit. Specific data elements can be selected so the number of possible unique values for an entity identifier formed from values for the selected data elements exceeds the number of distinct entities within the population. Such an entity identifier can be considered substantially statistically unique with respect to the population of entities represented by the data records.

The factor by which the number of possible unique entity identifier values exceeds the number of entities can be customized for a desired confidence level in associations made among data records. The greater the factor of excess, the more statistically unique the entity identifier is and the better the quality and specificity of the associations made using that entity identifier. A factor can be predetermined and can be designated, selected, and/or applied for an intended application and/or specific implementation to yield associations having a desired confidence level and/or quality.

For example, in an embodiment having data records representing a population of approximately 300,000,000 entities, data records can be selected so as to form one or more substantially statistically unique entity identifiers for the given population. Additionally, the extent to which the formed entity identifier is statistically unique relative to the applicable population can be customized based, at least in part, on selection of data elements. For example, if data elements are selected such that a formed entity identifier includes nine digits, with each digit possessing ten possible numerical values (0-9), then there are approximately one billion possible values for the entity identifier ($10^9$). This represents a factor of about 3.33, meaning there are approximately three and one third possible entity identifier values per entity in the population. In an alternative embodiment, data elements can be selected so that a formed entity identifier includes twelve digits, with each digit possessing ten possible numerical values (0-9). In such embodiment, there are approximately one trillion possible entity identifier values ($10^{12}$). Because the number of possible entity identifier values exceeds the number of entities within the population by a factor of over 3,333, the corresponding twelve-digit entity identifiers are more substantially statistically unique than were the nine-digit entity identifiers. It should be noted that various data elements can be combined to achieve the results indicated above. For example, two data elements with six-digit values can combine to form an entity identifier that is statistically comparable to an entity identifier formed from three data elements having values of four-digits each. The threshold for quantifying and/or qualifying a predetermined factor for a specific implementation and/or application can be determined based at least in part on a number of applicable considerations, including, without limitation, the extent to which the values for the selected data elements are randomly assigned and/or evenly distributed among the entities in the population, and the application's tolerance for false-positives, to name only a couple of examples. Those skilled in the relevant arts will appreciate that certain requirements, considerations, and/or characteristics of an intended application can require associations to achieve a specific confidence level and an appropriately applicable factor value and/or acceptable range of factor values can be determined accordingly.

Continuing for illustrative purposes with the example of house number data elements, and as one example of an additional and/or alternative requirement, entity identifiers can be defined to include a predetermined number of digits (e.g., 10, 12, 20, etc.). A sufficient number of house number data elements can be combined to achieve the desired number of digits in the entity identifier. Those skilled in the relevant arts will appreciate that increasing the quantity of house numbers providing values used to create the entity identifier also increases the statistical uniqueness of the formed entity identifier. As additional quantities of house number values are combined to create the entity identifier, it becomes statistically less likely that the same identifier can match multiple data records without the data records either referring to the same entity or entities that can be properly associated with one another (familial relatives, roommates, etc.).

At least in part by choosing sufficiently restrictive data element requirements and/or characteristics to form the entity identifiers, entity identifiers can be created that are substantially statistically unique (e.g., it can be said with substantially high statistical confidence, sufficient for the intended application and/or implementation, that a specific entity identifier corresponds to either one unique entity or separate unique entities that can be properly associated). For example, in one embodiment, entities in the United States for which sufficient corresponding address data records exist can be identified or associated using three or more house numbers contained in their financial, utility, or other address history records. In such an embodiment, the degree and/or extent of statistical uniqueness of the resulting identifier can be sufficiently and/or substantially high if the three house numbers contain a total of twelve or more digits when combined. This is because, in the Unites States, for example, a majority of house numbers have values with three or more digits that range between 100 and 20000. By volume, the majority of house numbers have four digits. Therefore, the odds of any two entity data records including the same three house numbers, regardless of sequence, without the represented entities being associated is approximately $(20000-100)^3$, or 1 in 7,880,599,000,000. In alternative implementations (for example, in a system for associating entities with addresses outside the United States, etc.), other characteristics can be chosen for the data elements used to form the entity identifier. Data elements can be chosen so as to produce confidence levels that are specifically tailored for the given application, implementation, and/or data records.

Figure 1:
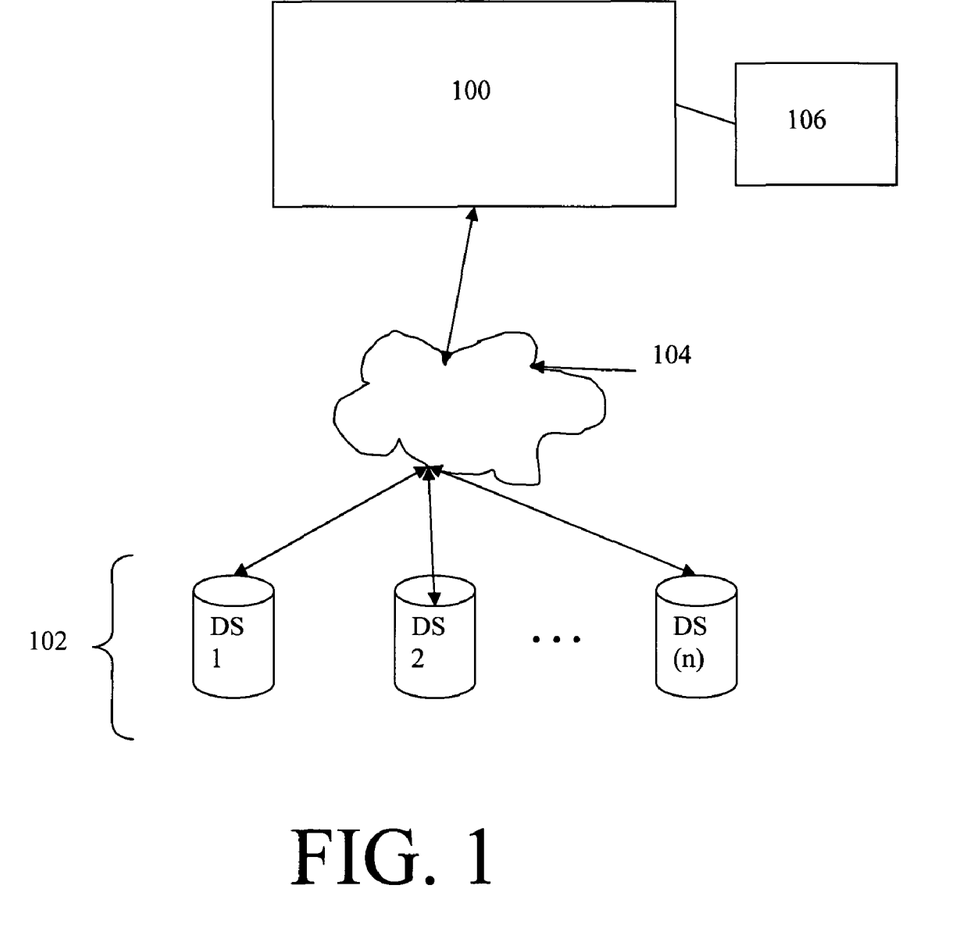
FIG. 1 illustrates a system in accordance with one embodiment.

Because of the statistical improbability of two discrete entities randomly sharing a common entity identifier with the above characteristics, embodiments consistent with the claimed subject matter can implement such substantially statistically unique entity identifiers in a wide variety of business applications and/or for other implementations and/or purposes that can require substantially high levels of accuracy in identifying and/or associating entities represented by data records from one or more data sources. FIG. 1 illustrates one example of a system for implementing identification and/or association embodiments consistent with the claimed subject matter. The system of FIG. 1 is presented for illustrative purposes and to facilitate discussion; it is not meant as a limitation on the scope of the attached claims, and those skilled in the relevant art will appreciate that apparatuses or other systems can be provided with fewer, alternative, and/or additional components and/or configurations while remaining consistent with the claimed subject matter.

With specific reference to FIG. 1, a computer system 100 is provided to access data records from one or more data sources 102. Computer system 100 can access data sources 102 directly, or via an optional network connection 104, such as the Internet, an intranet, LAN, WAN, and/or other network. Accordingly, data sources 102 can be maintained locally and/or remotely with respect to the location of computer system 100. Computer system 100 can also include and/or have access to a processing engine 106 capable of executing programming instructions for generating and/or applying one or more entity identifiers to identify and/or associate entities represented by the data records in data sources 102. Results of identification and/or association operations can be further processed and/or applied within computer system 100, or they can be organized for and/or communicated to one or more separate systems for subsequent handling, if or to the extent necessary and/or desirable given the intended functionality and/or specific implementation in which an embodiment operates.

Figure 2:
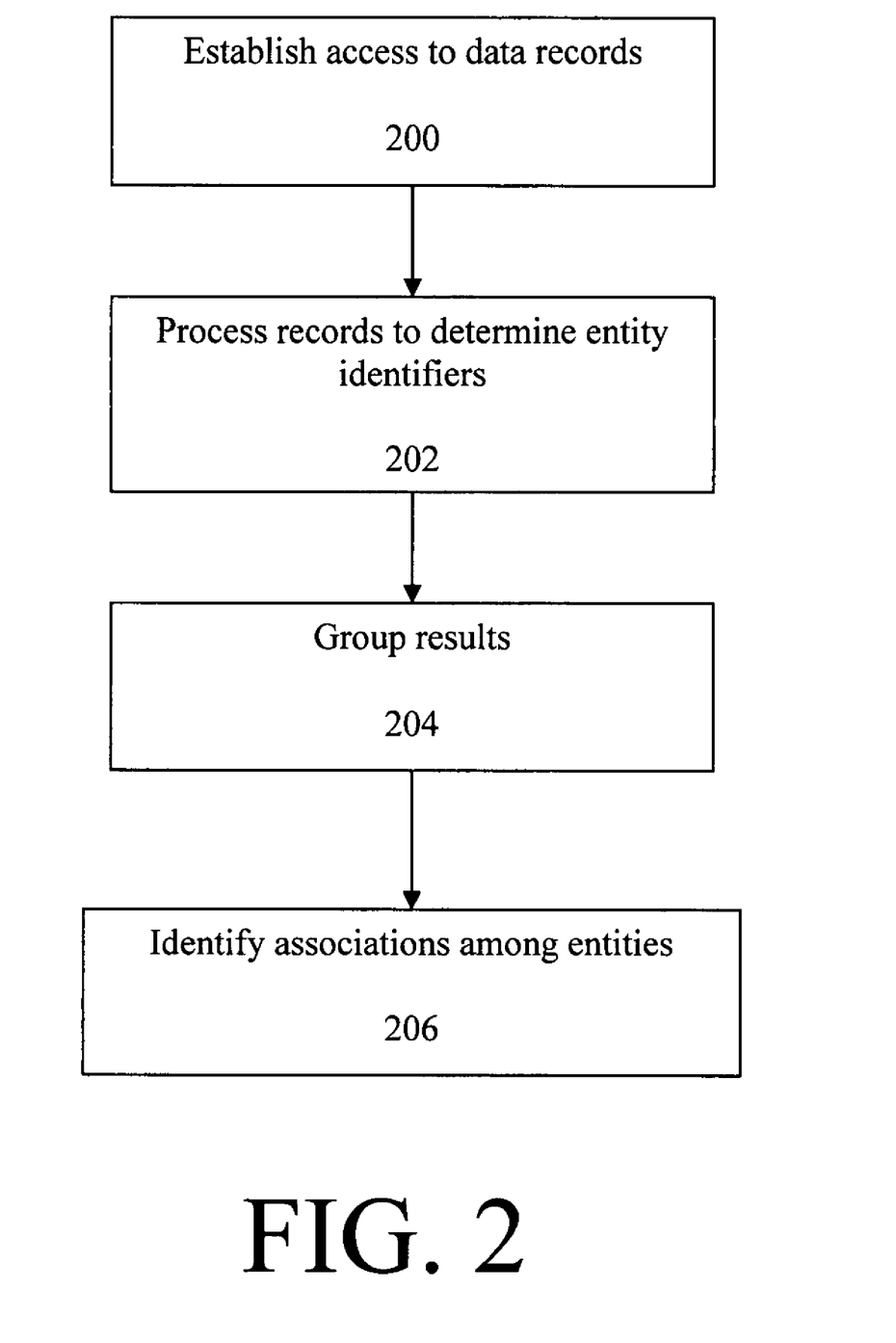
FIG. 2 presents one embodiment of a process flow diagram consistent with the claimed subject matter.

Consistent with the present application, apparatuses or systems, such as the system illustrated in FIG. 1, can implement various identification and/or association processes using substantially statistically unique identifiers as disclosed herein. FIG. 2 presents a process flow diagram including examples of steps that can be included in one embodiment of such a process. In particular, FIG. 2 can facilitate the identification of non-obvious associations between entities. The process of FIG. 2 can include step 200, for establishing access to data records, which can include securing access to data records not previously accessed and/or possessed. The data records can be contained within, maintained by, and/or otherwise made available from one or more separate, discrete data sources. At step 202, data records for each individual entity can be processed to identify entity identifiers that correspond to that entity. As one example illustrating step 202 using house numbers, if an entity's data record has house number values including 900, 725, 1255, and 1221, using combinations of three house numbers, and ignoring order, the following four entity identifiers can be formed: 9007251255, 9007251221, 72512551221, and 90012551221.

At step 204, results of step 202 can be organized and/or grouped. One example grouping embodiment can include grouping results first according to entity identifier, and then according to individual entity corresponding to each entity identifier. Other grouping methodologies can additionally and/or alternatively be employed. Using the results grouped in step 204, step 206 identifies associations among the entities and can initiate and/or facilitate additional processing of one or more of the data records based, at least in part, on the identified associations. Entities that share entity identifiers can be associated. If an entity identifier from the list grouped in step 204 corresponds to two data records, the entities represented by those data records can accordingly also be associated. The records representing those entities are either separate records representing the same entity, or separate records representing different entities that can be properly associated with one another. Context or data within the data records, application, and/or specific data elements can be used to distinguish between the two types of associations. For example, presence of the same substantially universal key, such as a full Social Security Number, in both data records can indicate that the associated records represent the same entity.

Figure 3:
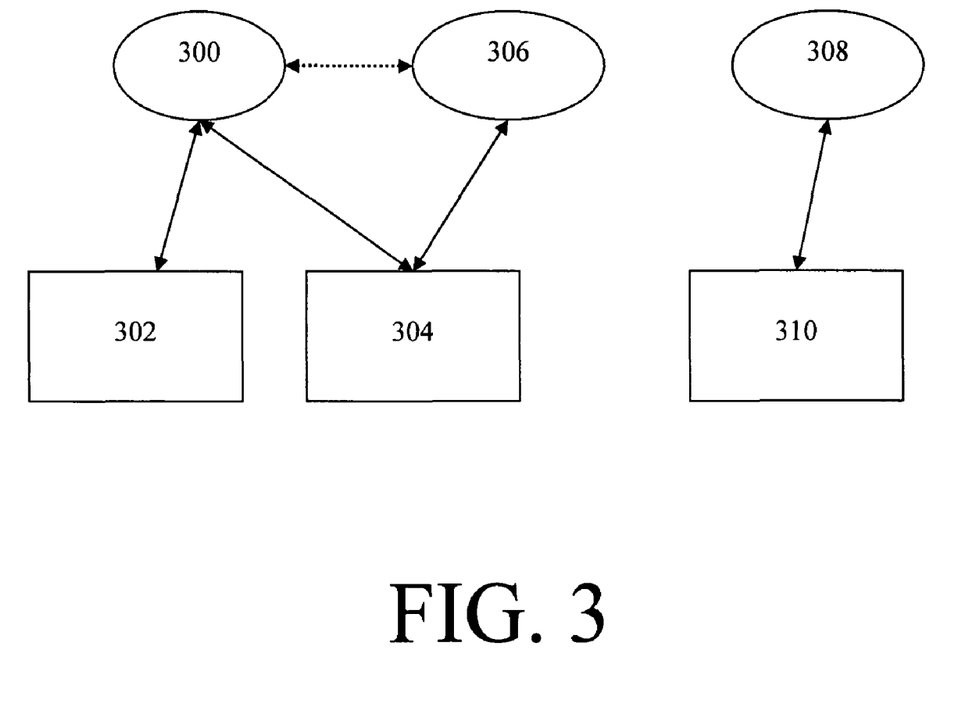
FIG. 3 conceptually illustrates associations among entities using entity identifiers in accordance with one embodiment.

FIG. 3 presents a diagram conceptually illustrating the association of multiple entities and/or data records using a common entity identifier. For an embodiment as illustrated in FIG. 3, data elements, such as house numbers, in one or more data records for a first entity data record 300 can form two entity identifiers, illustrated in FIG. 3 as entity identifier 302, and entity identifier 304. Entity data record 306 can also form entity identifier 304. Entity data record 308 forms entity identifier 310. Because entity data record 300 and entity data record 306 share entity identifier 304 in common, they can be associated. However, because entity data record 308 does not share a common entity identifier, it cannot be associated with either entity data record 300 or entity data record 306.

Figure 4:
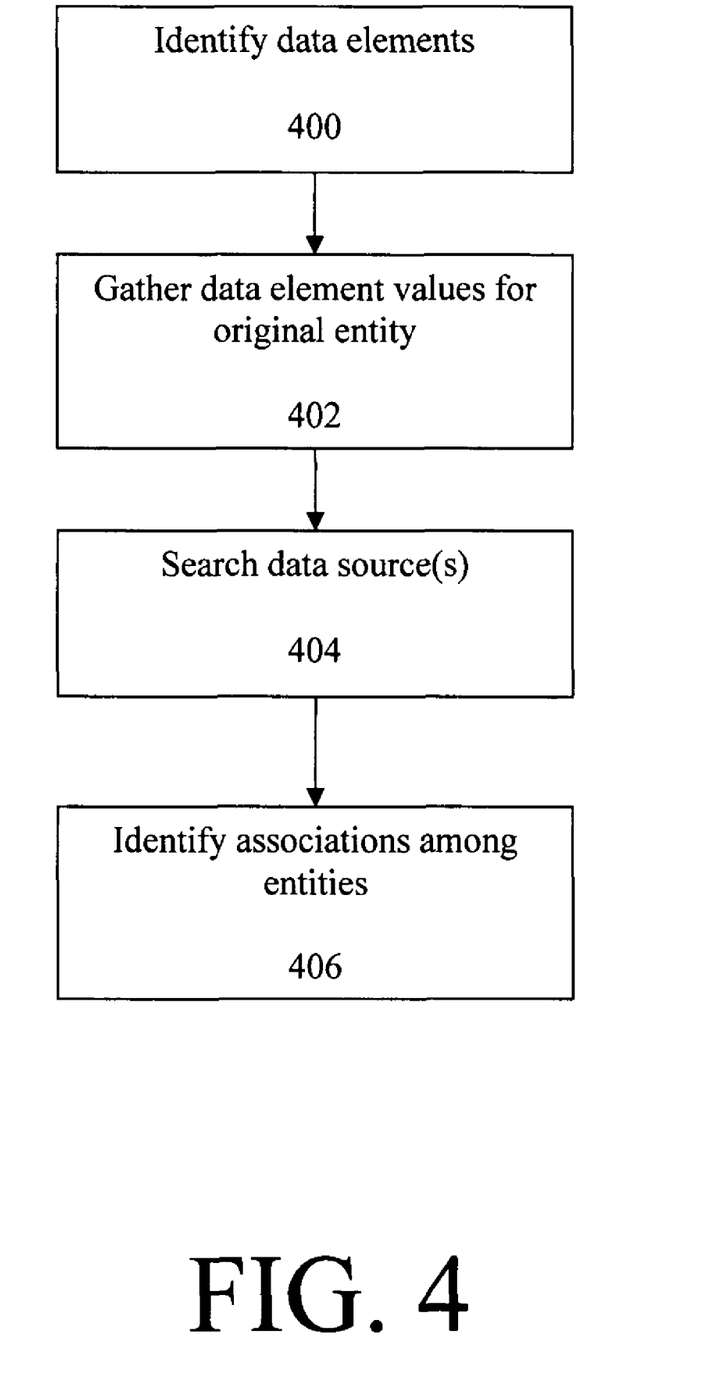
FIG. 4 presents a second embodiment of a process flow diagram consistent with the claimed subject matter.

FIG. 4 presents an alternative methodology and process flow to that depicted in FIG. 2. FIG. 4 illustrates a process flow diagram for identifying and/or associating entities using, as separate components, individual data elements that collectively can be combined to form an entity identifier. Given an original entity for which the values of data elements in a representative data record are known, an embodiment implementing the process of FIG. 4 can identify additional records corresponding to the same entity, as well as separate entities that can be associated with the original entity. With particular reference to FIG. 4, step 400 begins by identifying and selecting the type and/or quantity of data elements that can be employed so as to yield a substantially statistically unique entity identifier. In step 402, the values for each of those data element components are gathered from an identified data record representing an original entity. In step 404, one or more data sources can be queried to identify data records that include a value matching and/or substantially matching the value for any of the data element components identified in step 402. Separate searches/queries can be executed for each data element value. In step 406, associations can be identified among entities included in the search results. For example, data records with element values matching each of the search queries either represent the original entity, or entities that can be associated with the original entity with substantially statistical reliability. For example, in one embodiment consistent with the claimed subject matter, presented for illustrative purposes, and not by way of limitation, if a substantially statistically unique entity identifier can be formed for a given set of data records using three house numbers, separate searches can be conducted using each house number as a query, entities represented by data records that appear three times in the search results list, indicating that the data record included a match for each separate house number value searched, represent the original entity and/or associated entities (e.g., related entities sharing a common address history, etc.).

For efficiency or process optimization purposes, the searching procedure can also employ filtering logic to substantially reduce processing requirements when executing searches. Rather than searching all data records in all data sources for matches based on each search criterion, searching on the second criterion can be limited to those entities returned as results of a search on the first criterion. Similarly, a search performed using the third criterion can be limited to the results of the second search, and so on.

It should also be noted that, consistent with the claimed subject matter, entity identifiers corresponding to two or more data records do not have to represent exact matches in order for the data records and/or the corresponding entities to be associated. Based, at least in part, on factors such as the tolerance for false positive associations in a given application and/or implementation, a certain acceptable margin of error can be allowed for purposes of identifying matches between entity identifiers or selected data element component values. The use of the phrases "substantially matching," "substantial match," or the like in this application and the attached claims is meant to indicate matches that are either exact, or within a predetermined acceptable margin of error for a given implementation and/or application. For example, in an embodiment using an entity identifier formed from multiple data element values, the order in which the data values appear in two or more entity identifiers can be ignored for purposes of comparing entity identifiers and associating corresponding data records. An alternative embodiment can elect to ignore duplicate values in the formation and/or comparison of entity identifiers. Still other embodiments can allow for other variances in exact matching to be allowed. A few such examples can include rounding conventions for numeric data values, and/or common synonyms, abbreviations, and/or alternative spellings for alphanumeric data values, to illustrate but a few examples.

It will be obvious to those having skill in the art that many changes may be made to the details of the above-described embodiments without departing from the underlying principles of the invention. The scope of the present invention should, therefore, be determined only by the following claims.

The invention claimed is:

1. A method for associating data records representing one or more entities, comprising:
    obtaining access to a plurality of data records, each data record including a plurality of data elements;
    selecting two or more data elements from the plurality of data elements, the selected data elements being selected so as to enable one or more entity identifiers to be formed from values for the selected data elements from the plurality of data records, wherein the number of possible values for formed one or more entity identifiers exceeds, by at least a predetermined factor, a number of entities represented by the plurality of data records; and
    associating a first data record with a second data record if a first entity identifier formed from values for the selected data elements from the first data record substantially matches a second entity identifier formed from values for the selected data elements from the second data record.

2. The method of claim 1 wherein the data elements are selected so that the formed one or more entity identifiers are substantially statistically unique.

3. The method of claim 2 wherein the data elements are selected so that the formed one or more entity identifiers have a number of possible values in excess of a number of entities represented by the plurality of data records.

4. The method of claim 3 wherein the selected data elements are selected so that the number of possible values for the formed one or more entity identifiers exceeds the number of entities by at least a predetermined factor.

5. The method of claim 1, wherein the predetermined factor is determined based at least in part on a source for the plurality of data records.

6. The method of claim 1, wherein the predetermined factor is determined at least in part according to an intended purpose for associating the first data record with the second data record.

7. The method of claim 1, wherein the predetermined factor is determined so that the associating of the first data records with the second data record achieves at least a predetermined confidence level.

8. The method of claim 1 wherein the selected data elements encompass values that are substantially randomly assigned to entities represented by the plurality of data records.

9. The method of claim 1 wherein the selected data elements encompass values that are substantially evenly distributed among entities represented by the plurality of data records.

10. The method of claim 1, further comprising defining a criterion for the one or more entity identifiers, wherein the data elements are selected so that the one or more entity identifiers are formed to satisfy the criterion.

* * * * *